(12) United States Patent
Hoffmann

(10) Patent No.: US 7,021,590 B2
(45) Date of Patent: Apr. 4, 2006

(54) SYSTEM FOR ANGULAR CONNECTION OF MOUNTING RAILS

(75) Inventor: Armin Hoffmann, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/654,678

(22) Filed: Sep. 4, 2003

(65) Prior Publication Data

US 2004/0124318 A1 Jul. 1, 2004

(30) Foreign Application Priority Data

Sep. 5, 2002 (DE) ................. 102 40 999

(51) Int. Cl.
*F16L 3/00* (2006.01)
(52) U.S. Cl. .............. 248/49; 403/403; 403/231
(58) Field of Classification Search .......... 248/49, 248/188, 220.1, 231.7, 230.9, 61, 68.1, 48.1, 248/48.2; 403/188, 231, 232.1, 233, 403; 108/192, 180, 193, 159.11; 211/26, 81, 192
See application file for complete search history.

(56) References Cited

U.S. PATENT DOCUMENTS

| | | | | |
|---|---|---|---|---|
| 800,052 A | * | 9/1905 | Ayres | ............ 138/160 |
| 3,669,479 A | * | 6/1972 | Payne | ............ 403/230 |
| 3,747,540 A | * | 7/1973 | Salkoff et al. | ............ 108/156 |
| 4,139,316 A | * | 2/1979 | Svensson | ............ 403/172 |
| 4,656,801 A | | 4/1987 | Erlam | |
| 5,871,182 A | * | 2/1999 | Johnson et al. | ............ 248/49 |
| 6,120,206 A | * | 9/2000 | Benner et al. | ............ 403/231 |
| 6,171,013 B1 | * | 1/2001 | Lee | ............ 403/231 |
| 6,471,434 B1 | * | 10/2002 | Chin et al. | ............ 403/175 |
| 6,527,236 B1 | * | 3/2003 | Situ | ............ 248/220.1 |

FOREIGN PATENT DOCUMENTS

| | | |
|---|---|---|
| DE | 2504721 | 8/1976 |
| DE | 4421690 | 1/1996 |
| DE | 0052577 | 4/2002 |
| FR | 1605074 | 1/1973 |

* cited by examiner

*Primary Examiner*—Gwendolyn Baxter
(74) *Attorney, Agent, or Firm*—Abelman, Frayne & Schwab

(57) ABSTRACT

The system (31) for angular connection of mounting rails comprises a U-shaped connection member (1) that has on at least one lateral wall (2.1, 2.2, 3) openings (4.1, 4.2, 4.3) for passage therethrough of a fastener for fastening a connection member (1) to a mounting rail and a connection plate (21). The connection plate (21) has insertion projections (22.1, 22.2, 23) that can be inserted into insertion holes (5.1, 5.2, 6) provided for this purpose on the connection member (1). Using the bolt (25) the connection system (31) is fastened and at the same time the connection plate (25) is tightened with the connection member (1).

6 Claims, 4 Drawing Sheets

SYSTEM FOR ANGULAR CONNECTION OF MOUNTING RAILS

TECHNICAL FIELD

The invention relates to a system for angular connection of mounting rails using a U-shaped connecting member, which has openings in at least one lateral wall for passage therethrough of a fastener means for affixing the connecting member to a mounting rail.

PRIOR ART

Conduit installations are fastened to mounting rails arranged on a ceiling. For installation of conduit line arrangements erected in space are also used, which are generally comprised of individual standardized sections. Such constructions are assembled from a plurality of interconnected C-shaped mounting rails. A variety of systems for connecting mounting rails is known, which make possible erection of two and three-dimensional constructions comprised of mounting rails. Each type of connection requires specially configured connecting members for the connection.

DE 100 52 577 proposes a connecting system for connecting mounting rails that comprises a base member and an angular attachment member. The attachment member can be detachably connected to the base member by a snap-in connection. The attachment member has snap-in bosses that can be brought into engagement with four bore holes arranged symmetrically around a fastener opening.

The drawback in the known solution is that this connecting system can only conditionally take on torsional forces. Furthermore, the individual parts of the known connecting system, in particular the angular attachment member, is expensive to manufacture.

STATEMENT OF THE INVENTION

The object of the present invention is to provide a connecting system with a low number of standardized parts, and such parts are simple to manufacture.

According to the invention, a system for angular connection of mounting rails has a U-shaped connecting member which has openings in at least one lateral wall for passage therethrough of a fastener means for affixing the connecting member to the mounting rail. A connection plate is provided with at least one connecting means an be inserted into insertion openings provided therefor in the connecting member.

The U-shaped connecting member is adapted to the different configurations of mounting rails and can be positioned and affixed along the mounting rail. In the majority of cases, C-shaped mounting rails are used for erecting the construction. By means of so-called rail bolts, that are used in pipeline or conduit installations on mounting rails, the U-shaped connecting member is affixed on the mounting rail at the desired position. Quick-check bolts are used as rail bolts.

The connecting plate is shaped flat and can be arranged on the connecting member by at least one connecting means using the insert openings, so that a connection system is created that has high torsional strength. Preferably, all three lateral walls of the U-shaped connection member have openings for passage therethrough of the connecting means. An exemplary horizontally oriented mounting rail can, for example, be affixed in various positions on the connecting means, so that the open side of the connecting means can be oriented upwards, which assures a reliable connection of the mounting rail to another mounting rail or to a base member.

For manufacturing the connection system according to the invention, the reduction in the number of parts to two instead of four different members, more cost-effective manufacturing is made possible compared with the prior art. Storage is further simplified, because instead of a multitude of members, only two members are kept. Even planning for the user is simpler and more flexible in comparison with the known state of technology. The connection established is releasable and the entire connection system and the connecting member and the connection plate can be reused as individual parts.

Preferably, the insertion openings are provided at least in one end region of the connection member and each lateral wall of the connection member has at least one insertion opening. If the connection member is provided at one end of the mounting rail to be connected, the connection plate forms its facial termination and makes possible the connection of the connecting system.

The end of the mounting rail in this configuration of the connecting system is trilaterally enclosed and held, which assures high torsional stiffness of the connection at the end of the mounting rail held by the connection member. Since each lateral wall of the connection member has at least one insertion opening, the connection plate is held in at least three points on the connection member.

Preferably the connection plate has insertion projection which can be inserted into the insertion openings. Advantagously the insertion projections are configured as projections on the connection plate and are matched in their configuration to the configuration of the insertion openings. Preferably, the connection member has insertion openings on the substantially parallel running lateral walls of the U-shaped connection member, which are open on the free edge of the corresponding lateral wall. An opening or at least a recess is provided on the lateral wall of the U-shaped connection member and connects the essentially parallel lateral walls. The opening or the recess can, for example, be rectangular or circular in its configuration.

The insertion openings on the essentially parallel lateral walls of the U-shaped connection member have, at least in a partial region, projections shaped as lugs for the formation of a narrowed cross-section so that a snap-in connection can be created between the insertion projections and the insertion openings. When tightening the connection member, the insertion projections and the insertion openings are tightened together, whereby a secure connection between the connection member and the connection plate is established. The insertion projections on the connection plate have a receiving part, that can grip the walls of the corresponding lateral wall.

Advantageously, on at least one lateral wall of the connection member at least one additional opening is provided for passage therethrough of a fastener and on the connection plate at least one opening is provided for passage therethrough of a fastener. In a preferred embodiment, each lateral wall of the connection member has a further opening for passage therethrough of a fastener. A connection plate can be affixed to one of the lateral walls of the connection member by means of the opening in the connection plate and the additional opening in the lateral walls of the connection member. Accordingly, an angular connection between two connection members or between two mounting rails can be created. For a connection between two connection members a first connection member is positioned along a first mounting rail and affixed to the first mounting rail. At one end of a second connection member a connection plate is arranged on the connection member. Using the fastener, which is passed through the opening in the connection plate and through the additional opening in the lateral wall of the first connection member, both connection members are connected to each other. By tightening the fastener a secure connection between the individual parts connected to each other is established. Then a second mounting rail is affixed to the second connection member.

In an alternative embodiment, the connection plate is arranged at one end of the second connection member and the connecting system according to the invention is affixed to the one end of the mounting rail to be connected. In this process, the connection plate forms the leading end termination of the mounting rail in the direction of the connection. Then the mounting rail is arranged with the connecting system at the first, connection member already affixed to the first mounting rail. Upon tightening of the connector, which is passed through the opening in the connection plate and through the additional opening in the lateral wall of the first connection member, a secure connection between the individual, connected parts is established.

Advantageously, the at least one additional opening for passing therethrough of the fastener has a collar in at least one lateral wall of the connection member. Preferably, a further opening for passage therethrough of a fastener is provided on each lateral wall of the connection member. The collar serves on the one hand in centering and guiding the parts to be connected by a plurality of connection systems according to the invention and on the other hand as a carrier member of the created connection, in particular for assuming shearing forces, that can act upon the connection. Furthermore, the collar, at least in one region, can have a conical section so that upon tightening of the fastener both a force-locking and a form-locking connection is established, for example, between a vertically oriented connection element and a horizontally oriented connection element provided with a connection plate. The external surfaces of the collar can additionally be provided with profiling, for example, a knurling.

Preferably, the fastener comprises a threaded section and the opening for passage therethrough of the fastener on the connection member has an inner thread. The threaded section, for example, can be brought into engagement with the inner thread on the lateral wall of the connection member. If the opening on the connection member is provided with a collar, the inner thread has more threads, whereby an increased resistance to pull-out of the threaded section is produced. The length of the threaded section is preferably selected so that the threaded section, at its end situated in the direction opposite to the direction of tightening, does not penetrate the plane that is formed by the outer surface of the mounting rail on which the connecting system is arranged. Accordingly, there must not be an opening for the fastener engaging in the connection member in the region of the mounting rail connection and the connecting system according to the invention can be arranged along the entire mounting rail.

Preferably, at least one depression, optionally at least one opening as complementary snap-in means, is provided on at least one lateral wall of the connection member and at least one lug is provided as a snap-in means on the connection plate, which can be brought into engagement with the at least one depression or with the at least one opening on the connection element. Instead of a lug, projections can be provided on the connection plate that can be brought into engagement with the at least one depression or with the at least one opening. A releasable snap-in connection is created using the snap-in and complementary-snap-in means and makes possible, for example, subsequent correction of the orientation of a plurality of connecting systems relative to each other. Further, the use of a snap-in connection is advantageous, because handling of the connecting system is considerably simplified, since certain positions of the connection systems relative to each other can be predefined. In addition, the snap-in connection prevents rotation of the parts relative to each other in the fixed position.

The configuration of recesses or openings and lugs or projections is simple and economical in terms of manufacturing; for example, if the openings are configured as bore holes and the lugs as cylindrical projections that can be brought to engage in the bore holes. The greater number of recesses or openings the more the positions that are available to the user for the connection. However, the difficulty in selecting a desired position in a short time is directly proportional to the number of positions.

Advantageously, a plurality of recesses or a plurality of openings are on at least one lateral wall of the connection member and a plurality of lugs are provided on the connection plate. In a preferred embodiment the connection member has at least four symmetrical bore holes arranged around the additional opening on the connection member for passage therethrough of the fastener and which can be brought to engage with four lugs arranged symmetrically around the opening for passage therethrough of the fastener on the connection plate. Consequently, a connecting system can be positioned relative to a connection member, for example, with four recesses rotated 90° in each case. By virtue of the central disposition of the openings for passage therethrough of the fastener, a uniform engagement between lug and opening is assured and, furthermore, any incumbent loading is uniformly distributed to the snap-in connection. The recesses or the openings are preferably disposed transverse to the longitudinal direction centrally on the connection member and the connection plate, in order to create the maximum possible connection opportunities between a connecting system and a connection member.

Other advantageous embodiments and combinations of the features of the invention will become apparent from the following detailed description and the patent claims.

BRIEF DESCRIPTION OF THE DRAWINGS

The invention will be more completely described in the following read together with an exemplary embodiment, wherein.

In principle, identical parts in the figures are identified using the same reference numerals.

DETAILED DESCRIPTION OF THE INVENTION

Figure 1:
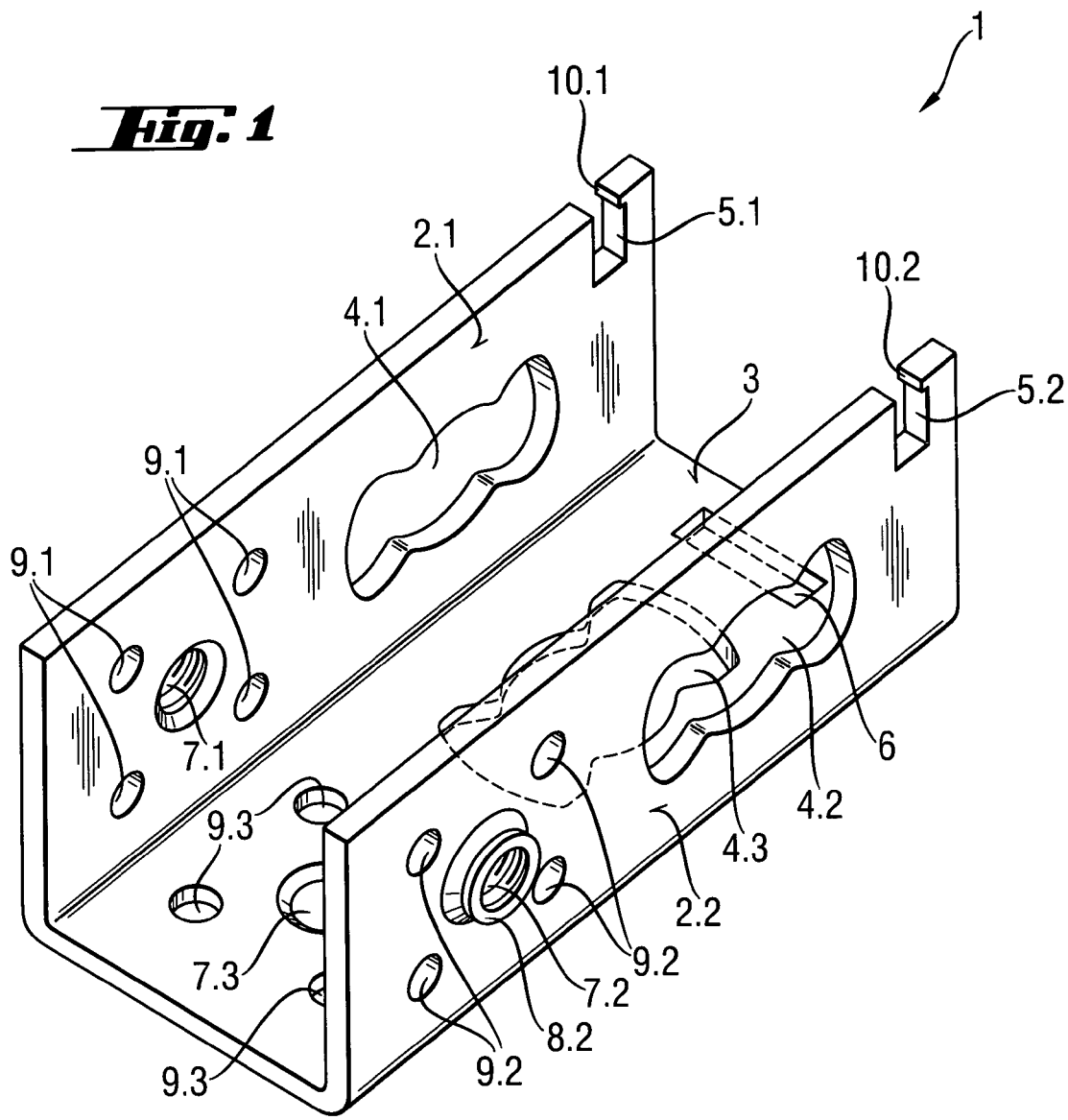
FIG. 1 is a perspective view of the connection member according to the invention.

FIG. 1 is a perspective view of the connection member according to the invention. The U-shaped connection member 1 has two lateral walls 2.1 and 2.2 that run substantially parallel to and spaced from each other and a third lateral wall 3 connecting one end of the two lateral walls 2.1 and 2.2. An opening 4.1, 4.2, 4.3 is arranged on each of the lateral walls 2.1, 2.2 and 3 for passage therethrough of a rail bolt. The connection member is positioned and fixed on a mounting rail by means of the rail bolt (not shown here). At an end region of the connection member 1 an insertion opening or slot 5.1 or 5.2 is configured on each the lateral walls 2.1 and 2.1 running substantially parallel to each other. The insertion openings 5.1 and 5.2 have snap-in lugs 10.1 and 10.2 in the region of the free end, the lugs narrow the cross-section in the plane of the lateral wall 2.1 or 2.2. The third lateral wall 3 is provided with an insertion opening 6.

An additional opening 7.1, 7.2 or 7.3 is provided in the lateral walls 2.1, 2.2 or 3 for passage therethrough of a bolt. The openings 7.1, 7.2 and 7.3 are provided with an inner thread, in which the fastener (in this instance the bolt 25, see FIG. 2) can engage. Each opening 7.1, 7.2 or 7.3 has a collar (e.g. the collar 8.2) on the external side of the corresponding lateral wall 2.1, 2.2 or 3 of the connection member 1. Each of the collars (e.g. 8.2) is provided with a conical section. Four bore holes 9.1, 9.2, or 9.3 are provided symmetrically around each additional opening 7.1, 7.2 and 7.3, the bore holes are configured as complementary snap-in means for a connection plate provided with snap-in members. The collar (e.g. the collar 8.2) and the snap-in connection provide heightened reliability of the connection against failure, in particular relative to the shearing forces acting on the connection.

Figure 2:
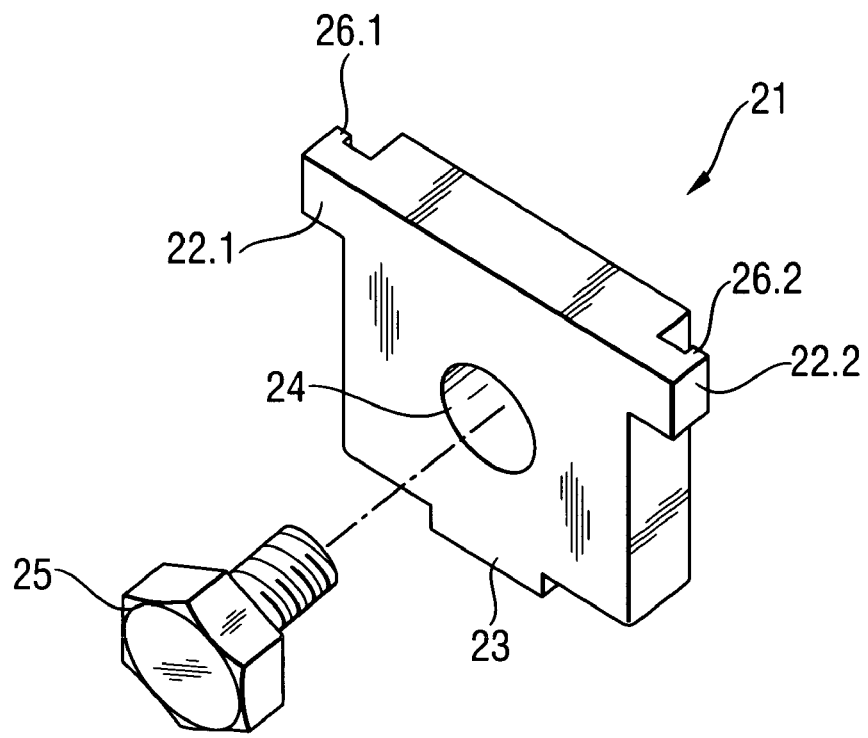
FIG. 2 is a perspective view of a first side of the connection plate according to the invention.

FIG. 2 is a perspective representation on a first side of the connection plate according to the invention. The connection plate 21 is planar and flat and with two insertion projections 22.1 and 22.2 that can be brought into engagement with the insertion openings 5.1 and 5.2 and snap-in lugs 10.1 and 10.2 in the lateral walls 2.1 or 2.2 of the connection member 1, and an insertion projection 23, which can be brought into engagement with the insertion opening 6 in the lateral wall 3 of the connection member 1. The connection plate 21 further has a bore hole 24 for passage therethrough of the bolt 25.

Figure 3:
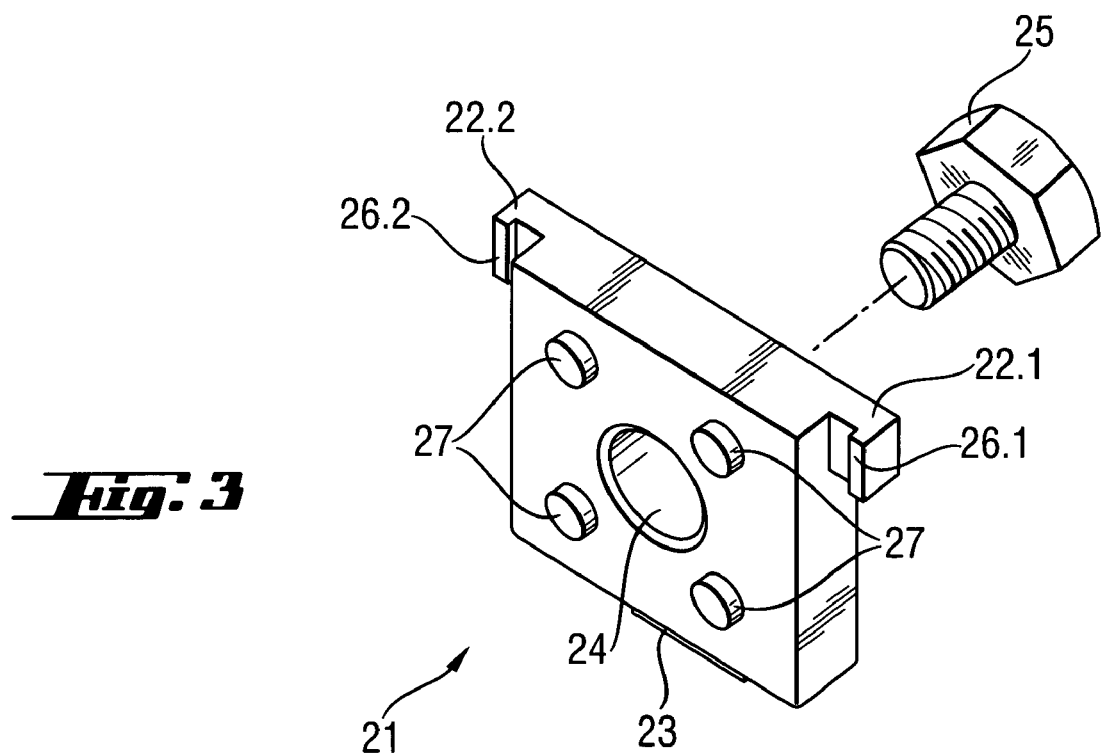
FIG. 3 is a perspective view of a second side of the connection plate according to the invention.

FIG. 3 is a perspective representation onto a second opposite side of the connection plate according to the invention. The insertion projections 22.1 and 22.2 are provided with projections 26.1 and 26.2 on their outside ends, the projections each form a U-shaped receptacle at the insertion projections 22.1 or 22.2. The size of the U-shaped receptacle corresponds at least to the wall thickness of the lateral wall 2.1 or 2.2 of the connection member 1. On this side of the connection plate 21, four lugs are provided 27 that form the snap-in means and which can be brought into engagement in the bore holes 9.1, 9.2 and 9.3 in the lateral walls of the connection member. The lugs 27 can be rotated into four positions, each at 90°, on one of the three lateral walls 2.1, 2.2 or 3 of the connection member 1.

Figure 4:
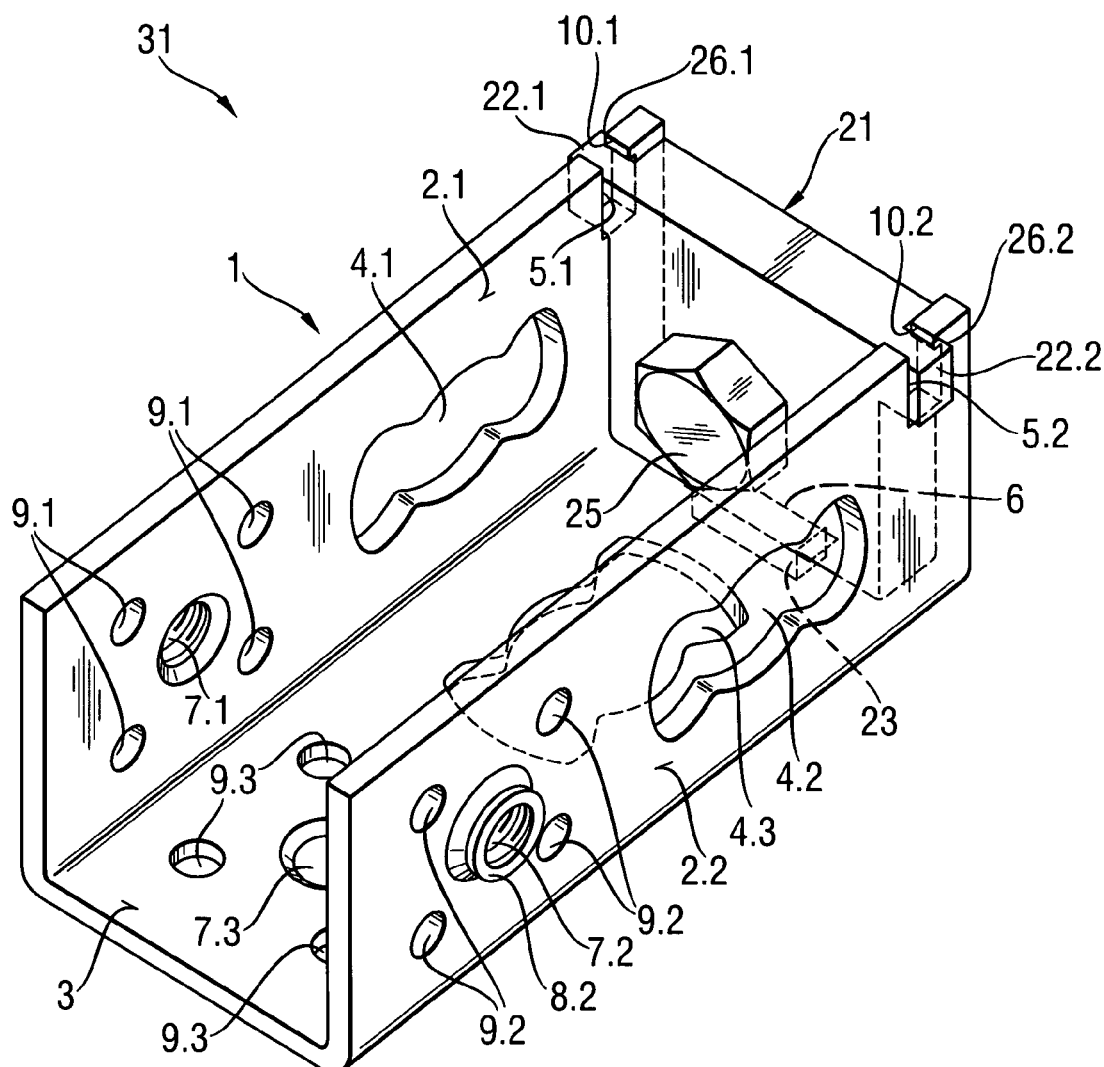
FIG. 4 is a perspective view of the connection system according to the invention.

FIG. 4 is a perspective representation of the connecting system according to the invention. The connecting system 31 comprises a connection member 1 and a connection plate 21, which is installed in the insertion openings 5.1, 5.2 and 6. With the combination of the locally narrowed cross-section of the insertion openings 5.1 and 5.2 and the insertion projections 22.1 and 22.2 gripping around the walls of the lateral wall 2.1 and 2.2, a secure connection between the connection member 1 and the connection plate 21 is established upon tightening the bolt 25. The connection system 31 can, for example, be fastened to another connection member by using the connection plate 21.

Figure 5:
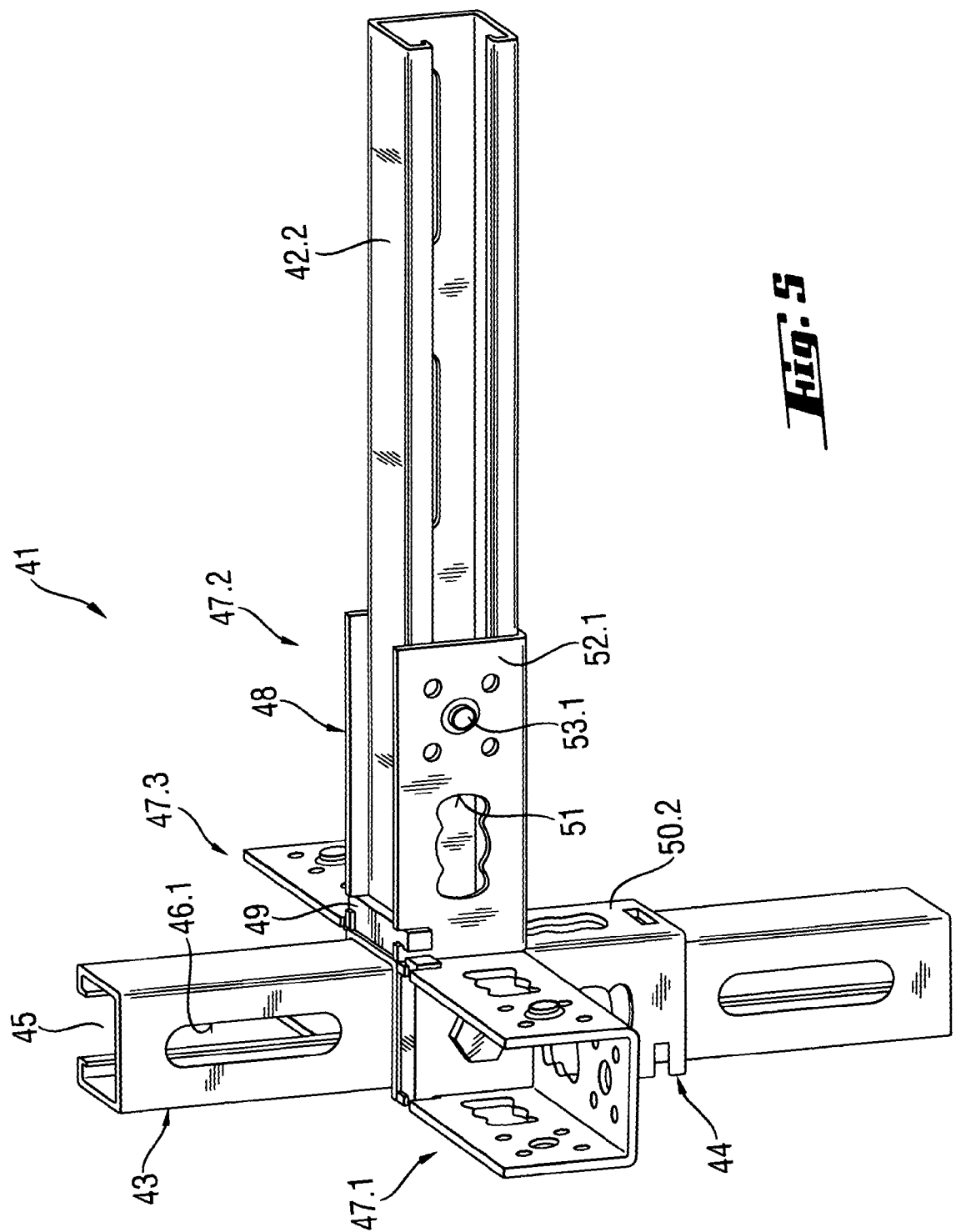
FIG. 5 is a perspective view of a multiple connection arrangement formed of a plurality of connection systems according to the invention.

FIG. 5 shows a perspective representation onto a rail arrangement comprised of a plurality of connection systems according to the invention. Using the rail arrangement 41, three horizontally oriented C-shaped mounting rails are connected to a vertically oriented C-shaped mounting rail 43. For the sake of clarity and comprehensibility of the view represented, only the horizontally oriented mounting rail 42.2 is represented alongside the vertically oriented mounting rail 43. The following narrative applies appropriately to other, exemplar vertically oriented mounting rails.

In a first step the U-shaped connection member 44, which is configured to correspond to the above described connection element 1, is fixed at a height to the vertically oriented, C-shaped mounting rail 43. The fixation of the connection member 44 is achieved, for example, using a rail bolt, which is passed through the opening for fastening the connection member 44 to the exposed side 45 of the mounting rail 43 and is tightened by means of rotation. Because the mounting rails 43 and 42.2 have openings also on other lateral walls of the C-shaped section (for example, the opening 46.1 on the mounting rail), fixation of the connection member 44 can be done using a suitable fastener in these openings.

Three connection systems 47.1, 47.2 and 47.2 according to the invention are connected to the three lateral walls of the connection member 44. Then, representing all three connection systems 47.1, 47.2 and 47.3, the further procedures is described using the example of the connection system 47.2. The connection system 47.2 comprises the connection member 48, which is shaped similarly to the other connection members (e.g. connection member 1 or 44), and the connection plate 49, which is configured similarly to the above described connection plate 21. The connection plate 49 is installed in the connection member 48 and the connection system 47.2 connected to the lateral wall 50.2. The lugs of the connection plate 49 engage in the bore holes that are formed around the connection opening on the lateral wall 50.2 of the connection member 44. The represented orientation of the connection system 47.2 with the exposed side upwards is a possibility for orientation of the connection system 47.2 on the connection member 44. Furthermore, the connection system 47.2 can be arranged in the case of the disposition of four symmetrically disposed bore holes and four lugs, each spaced at 90° apart on the connection member 44, that can be brought into engagement with the bore holes.

Using a bolt in the connection plate 49, the connection system 47.2 can be affixed to the connection member 44 and at the same time, the connection plate 49 tightened using the connection member 48. The mounting rail 42.2 to be connected using the mounting rail 43 is installed in the connection member 48 and after its alignment, affixed to the connection member 48. For example, for securing the mounting rail 42.2 a rail bolt is passed through the opening 51 on the lateral wall 52.1 of the connection member 48 and tightened.

Accordingly, in order that one type of mounting rail can carry elevated loads that cannot be carried or only conditionally carried by a single mounting rail, two mounting rails can be arranged parallel to each other. Using the connecting systems according to the invention such constructions can also be realized. To do this, a further connection system according to the invention is provided oriented parallel to the connection system 47.1 at the connection opening 53.1, so that two receivers for two mounting rails running parallel to each other are provided.

Furthermore, a connection member can be positioned along a horizontally oriented mounting rail and, using a rail bolt, secured on the mounting rail. Then, there are three possibilities for an angular connection of a further mounting rail in the space.

The connection plate can have an elevated wall thickness in the direction of the lower insertion projection for establishing a non-rectangular connection of two mounting rails, for example. In this embodiment of the connection plate, the connection member together with this connection plate forming the connecting system is oriented at an angle respective of this connection plate.

In summary, it must be stated that a connection system is created that has a low number of standardized parts. With the connection systems according to the invention, a multitude of differently configured constructions can be erected, wherein the individual connections are simple to execute and provide high reliability of connection. The parts of the connection system can be manufactured simply and inexpensively.

The invention claimed is:

1. A system for an angular connection of mounting rails (42.2, 43) comprises a U-shaped connection member (1:48), with spaced apart end regions having at least one lateral wall (2.1, 2.2, 3; 52.1) with openings (4.2, 4.2, 4.3; 51) for passage therethrough of a fastener for securing the connection member (1; 48) to the mounting rail (42.2, 43), characterized in that a separate flat-sided planar connection plate (21; 49) is provided having at least one connection shaped means, for insertion into insertion openings (5.1, 5.2, 6) in said connection member (1; 48), wherein said at least one lateral wall (2.1, 2.2, 3; 52.1) of the connection member (1; 48), has at least one additional opening (7.1, 7.2, 7.3) in an opposite end region of said connection member spaced from said connection plate with a passage therethrough for another fastener, and at least one opening (24) is provided in the connection plate (21, 49) for passage therethrough of another fastener, and wherein said at least one additional opening (7.1, 7.2, 7.3; 53.1) for passage therethrough of said another fastener has a collar (8.2) extending outwardly from said at least one lateral wall (2.1, 2.2, 3; 52.1) of said connection member (1; 48).

2. A system as set forth in claim 1, wherein said insertion openings (5.1, 5.2, 6) are provided in at least one of said end regions of said connection member (1; 48) comprising three lateral walls disposed in a U-shaped arrangement and each of said lateral walls (2.1., 2.2., 3; 52.1) of said connection (1; 48) has at least one said insertion opening (5.1, 5.2, 6).

3. A system as set forth in claim 1, wherein said connection plate has insertion projections (22.1, 22.2, 23) configured as said connection shaped means, for inserting into the insertion openings (5.1, 5.2, 6).

4. A system as set forth in claim 1, wherein another fastener comprises a bolt (25), and said opening (7.1, 7.2, 7.3; 53.1) has an inner thread for passage therethrough of said bolt.

5. A system as set forth in claim 1, wherein at least one said lateral wall (2.1, 2.2, 3:52.1) of the connection member (1; 48) has at least one additional opening (9.1, 9.2, 9.3) in an end region spaced from said connection plate with at least one recess therein, and at least one lug (27) is provided for engagement with said at least one additional opening in said connection member (1; 48).

6. A system as set forth in claim 5, wherein a plurality of said additional openings (9.1; 9.2., 9.3) and recesses are provided in said at least one lateral wall (2.1, 2.2, 2.3; 52.1) of said connection member (1; 48) and a plurality of lugs (27) are provided for engagement therewith.

\* \* \* \* \*